(12) United States Patent
Grimm et al.

(10) Patent No.: US 8,099,931 B2
(45) Date of Patent: Jan. 24, 2012

(54) METHOD AND DEVICE FOR PACKAGING OF BULK GOODS IN BAGS

(75) Inventors: Bernhard Grimm, Kempten (DE); Wolfgang Lachmann, Memmingen (DE)

(73) Assignee: Multivac Sepp Haggenmueller GmbH & Co. KG (DE)

( * ) Notice: Subject to any disclaimer, the term of this patent is extended or adjusted under 35 U.S.C. 154(b) by 110 days.

(21) Appl. No.: 12/386,005

(22) Filed: Apr. 10, 2009

(65) Prior Publication Data

US 2009/0260326 A1 Oct. 22, 2009

(30) Foreign Application Priority Data

Apr. 18, 2008 (DE) .................. 10 2008 019 625

(51) Int. Cl.
*B65B 31/00* (2006.01)
(52) U.S. Cl. ............... 53/434; 53/405; 53/511
(58) Field of Classification Search ............ 53/434, 53/479, 405, 433, 481, 511, 512, 408, 86, 53/95, 249, 91, 373.4
See application file for complete search history.

(56) References Cited

U.S. PATENT DOCUMENTS

| | | | |
|---|---|---|---|
| 3,545,983 A | | 12/1970 | Woods |
| 3,693,314 A | * | 9/1972 | Reid et al. ............... 53/417 |
| 3,699,742 A | * | 10/1972 | Giraudi ............... 53/86 |
| 3,832,824 A | * | 9/1974 | Burrell ............... 53/417 |
| 3,958,391 A | | 5/1976 | Kujubu |
| 4,016,705 A | * | 4/1977 | Wilson et al. ............... 53/407 |
| 4,164,111 A | * | 8/1979 | Di Bernardo ............... 53/434 |
| 4,308,900 A | * | 1/1982 | Vadas ............... 141/1 |
| 4,457,122 A | * | 7/1984 | Atkins et al. ............... 53/434 |
| 4,471,599 A | * | 9/1984 | Mugnai ............... 53/434 |
| 4,586,320 A | * | 5/1986 | Takai et al. ............... 53/512 |
| 4,754,596 A | | 7/1988 | Yasumune et al. |
| 4,779,398 A | | 10/1988 | Glandon et al. |
| 5,056,292 A | | 10/1991 | Natterer |
| 5,062,252 A | * | 11/1991 | Kupcikevicius ............... 53/434 |
| 5,386,678 A | | 2/1995 | Kujubu |
| 2006/0037884 A1 | | 2/2006 | Doyle et al. |
| 2008/0000204 A1 | | 1/2008 | Turvey et al. |

FOREIGN PATENT DOCUMENTS

| | | |
|---|---|---|
| AT | 195840 | 6/1957 |
| DE | 25 52 342 | 5/1985 |
| EP | 0 398 306 A1 | 11/1990 |
| FR | 1115890 A | 4/1956 |

OTHER PUBLICATIONS

European Search Report, Application No. 09158039.9-2308, Applicant: MULTIVAC Sepp Haggenmuller GmbH & Co KG, Dated Aug. 17, 2009—4 Pages.

* cited by examiner

*Primary Examiner* — Sameh H. Tawfik
(74) *Attorney, Agent, or Firm* — Brooks Kushman P.C.

(57) ABSTRACT

A method or a device, respectively, for packaging of bulk goods in bags (26) comprises a lid (5) which forms a chamber (4) together with a lower portion (25), or the method is carried out in the chamber (4), respectively. It is the object of the method or the device, respectively, to package bulk goods in a chamber machine under vacuum. For this purpose a bag (26) is perforated in the chamber (4) or is inserted into the chamber (4) already perforated.

24 Claims, 5 Drawing Sheets

METHOD AND DEVICE FOR PACKAGING OF BULK GOODS IN BAGS

TECHNICAL FIELD

The present invention relates to a method and device for packaging of bulk goods, in particular of powdery or granular products in bags, in particular for a chamber machine or a chamber belt machine, respectively.

BACKGROUND

For packaging of bulk goods, in particular powdery or granular products, respectively, devices and methods, respectively, are known by which bags are filled and thereafter sealed in upright position in order to prevent that the bulk goods contaminate the sealing seam. Because of such a contamination of the sealing seam a secure sealing can not be guaranteed. Inclusions of air in the bag can not be prevented by this method, which leads to the fact that on one hand the packaging volume increases and on the other hand the optical appearance suffers.

Furthermore, devices are known by which the bags filled with bulk goods are sealed while lying. Evacuation is not possible in conventional chamber machines since the bulk goods are sucked in the direction to the bag mouth by the airflow resulting from the evacuation, and therefore contaminate the sealing seam.

SUMMARY

Therefore, it is the object of the present invention to provide an improved method and device which enable to package bulk goods in a chamber machine under vacuum.

By perforating the bag by means of a perforation device, the gas or the air, respectively, escapes from the bag through the created openings slowly enough despite the vacuum present in the chamber, in order to prevent that the content of the bag, i.e. the bulk goods, in form of a powder or granular material is sucked into the direction of the bag mouth or the sealing region, respectively and/or is pressed by the foil of the collapsing bag and contaminates the sealing region. An airflow out of the bag which may transport the product particles to the suction opening is prevented. In this manner bulk goods can be packaged without costly modification by means of the chamber machine.

The combination of the airtight sealing of the bag by a clamping bar and the perforation of the bag foil has the advantage compared with throttling in the vacuum pipe that the airflow out of the bag can be adjusted much more precisely. When throttling takes place in the vacuum pipe, it can not be excluded that the airflow from the bag becomes too strong and therefore product content can reach the sealing region because of the flow technical properties of the corresponding chamber machine. By the present invention the airflow can be determined precisely by the number and the size and the area, respectively, of the openings as well by the vacuum value. By the generation of many small openings the formation of an airflow which transports product particles can be minimized or prevented, respectively.

Further features and advantages of the invention follow from the description of embodiments referring to the enclosed drawings.

DETAILED DESCRIPTION

In the following with reference to FIGS. 1-3, a first embodiment of the invention is described exemplarily with a chamber belt machine. In the present embodiment the chamber belt machine is formed as an automatic chamber belt machine.

Figure 1:
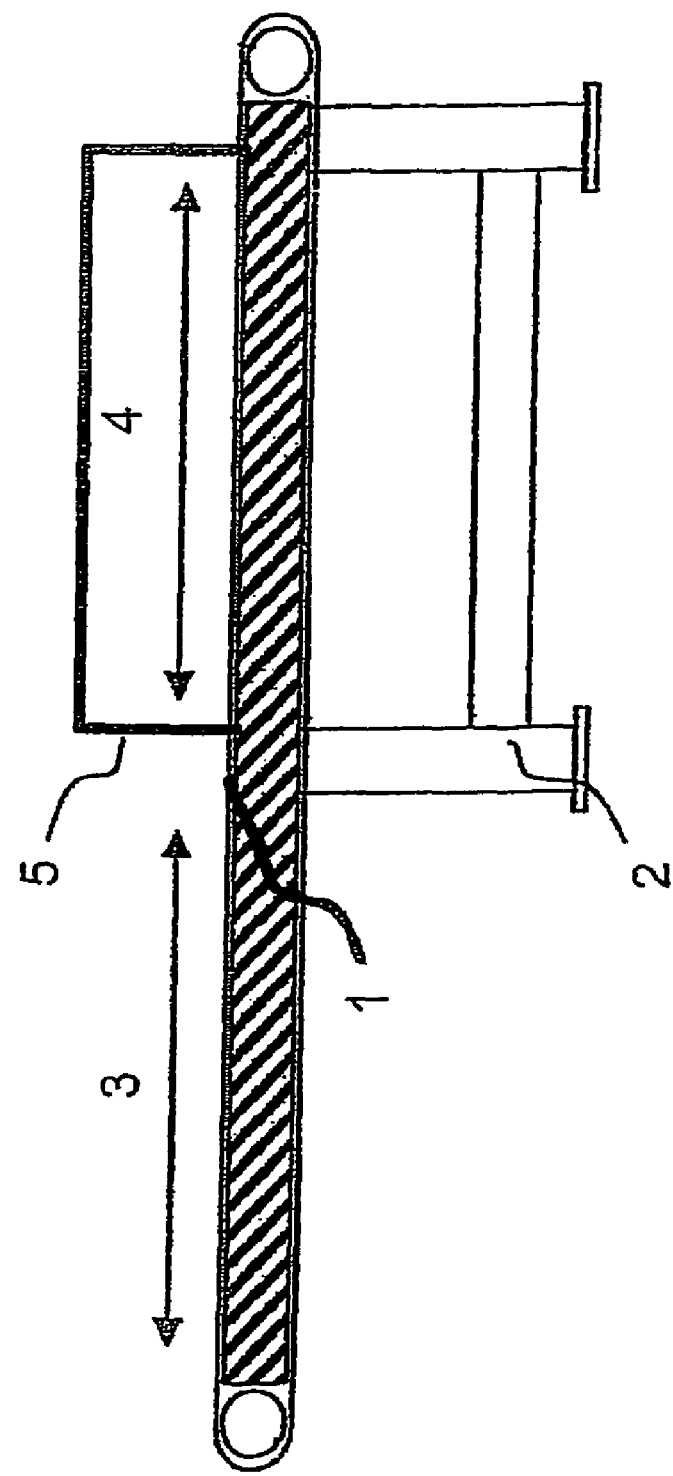
FIG. 1 a schematical side view of a chamber belt machine.

FIG. 1 shows a schematical view of a chamber belt machine having a conveyor belt 1, a rack 2, a placing region 3, a chamber 4 and a lid 5. The chamber 4 is formed by the lid 5 together with a lower portion 25 (see FIG. 2a to e), wherein the lid 5 may be automatically opened drivingly by a motor for example or may be opened manually, for example in order to receive bags 26 to be evacuated or to be sealed (see FIGS. 2a to e) which are supplied by the conveyor belt 1 automatically, and which closes thereafter to form the chamber 4.

Figure 2A:
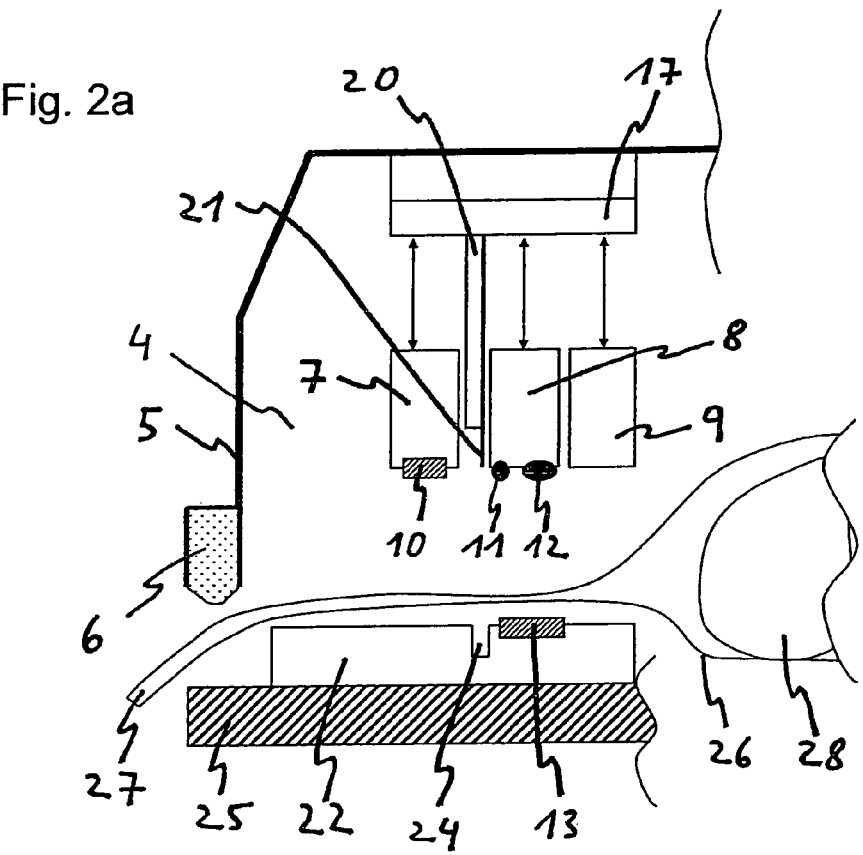
FIG. 2a a schematical sectional view of a part of the chamber belt machine with a lid raised.

FIG. 2a shows a schematical sectional view of a part of the chamber belt machine. The lid 5 is provided at its lower edge with a continuous lid gasket 6 to guarantee that the lid 5 or the lid gasket 6 respectively, forms the airtight chamber 4 together with a lower portion 5 during closing of the lid 5. A receiving block 17 is provided at the inner side of the top face of the lid 5. A clamping bar accommodation 7, an accommodation 8 and a limiting beam 9 are provided lowerable and raisable, respectively, at the receiving block 17 (shown by three double arrows). At the lower side of the clamping bar accommodation 7 a clamping bar 10 and at the accommodation 8 a separating wire 11 and a sealing wire 12, respectively, are provided. The clamping bar accommodation 7, the accommodation 8, the limiting beam 9, the clamping bar 10, the separating wire 11 and the sealing wire 12 each extend along the whole width of the bag into the plane of the drawing and out of it, respectively. Furthermore, a perforation device accommodation 20 having a lowerable perforation device 21 is provided at the receiving block 17. In the chamber 4 an anvil accommodation 22 is provided which is again provided on the lower portion 25. In the anvil accommodation 22 an anvil 13 is embedded which cooperates with the separating wire 11 and the sealing wire 12 during the operation. Furthermore, in the anvil accommodation 22 a slit 24 is provided which cooperates with the perforation device 21 during the operation. The anvil accommodation 22, the anvil 13 as well as the slit 24 extend along the whole width of the bag into the plane of the drawing and out of it, respectively.

In the chamber 4 a bag 26 is arranged wherein a product 28 is arranged and the bag neck 27 thereof extends in FIG. 2a to the left out of the chamber 4. The bag 26 is arranged such that the bag neck 27 is essentially located between the clamping bar 10, the separating wire 11 or the sealing wire 12, respectively, and the anvil accommodation 22.

Figure 3:
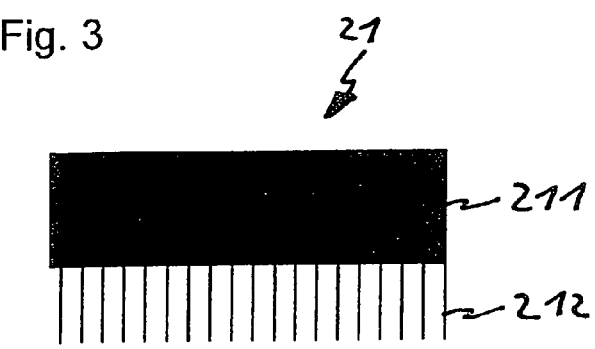
FIG. 3 a schematical sectional view of a perforation device.

FIG. 3 shows the perforation device 21. A plurality of or multiple needles 212 are provided in a needle accommodation 211. In this manner it is possible that the bag 26 is provided with a plurality or multiple of openings.

In FIGS. 2a to e the operation of the inventive device or the inventive method, respectively, is shown.

As is shown in FIG. 2a, the bag 26 filled with bulk goods but not yet sealed is placed in the chamber 4 between the clamping bar 10, the separating wire 11 and the sealing wire 12, respectively, and the anvil accommodation 22. It has to be taken care of that the filled bag 26 is cautiously placed inside or on the conveyor belt 1 respectively (see FIG. 1) in order to prevent contamination of the sealing region by bulk goods sliding forward by themselves. The clamping bar accommodation 7, the accommodation 8 and the limiting beam 9 are in their rest position and their original position, respectively in this step. The lid 5 is in a raised position.

Figure 2B:
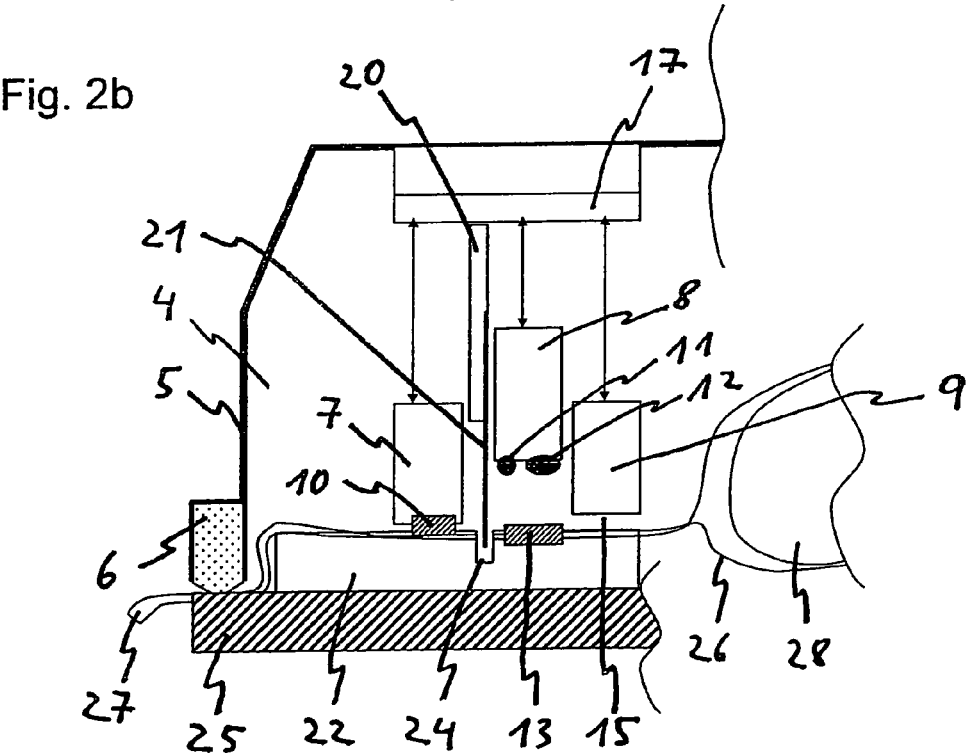
FIG. 2b a schematical sectional view of a part of the chamber belt machine with a lowered perforation device and lowered lid.

Thereafter, as shown in FIG. 2b, the lid 5 is closed. The lid forms the chamber 4 together with a lower portion 25. Before and/or at and/or after closing the lid 5, the perforation device 21 is lowered and perforates the bag 26. In the shown embodiment a plurality of needles 212 (see FIG. 3) create a multiple of essentially circular openings in the bag foil. The openings are created with a distance from each other of 1 mm to about 100 mm and with an area of about 0.002 $mm^2$ to about 0.2 $mm^2$. Preferably, the openings are created with a distance of about 1 mm to about 50 mm from each other and a surface of about 0.002 $mm^2$ to about 0.1 $mm^2$. Further preferably, the openings are created with a distance of about 1 mm to about 20 mm from each other and an area of about 0.005 $mm^2$ to about 0.1 $mm^2$. The needles 212 (see FIG. 3) of the perforation device 21 are arranged and adapted accordingly. The generated holes form a line in the bag 26 which extends into the plane of the drawing and out of it, respectively, along the whole width of the bag 26. The generated perforation in the bag 26 can take place in different manners. For example also a plurality of rows of needles 212 (see FIG. 3) are conceivable. It is also conceivable to create slits or other openings in the bag foil. The perforation of the bag in the sense of the inventive idea means to provide the bag 26 with a plurality of regularly arranged holes with a predetermined shape and size. The shape, size and number of created openings in the bag 26 is selected dependent on the performance of the vacuum pump, the desired cycle performance or the process time, respectively, and the properties of the product 28, for example the grain size.

In the same step the limiting beam 9 is lowered. A gap 15 remains between the limiting beam 9 and the anvil accommodation 22 in order to make possible an escape of the air from the bag 26 during later evacuation of the chamber 4. The escaping air from the bag 26 causes that the bag foil attaches to the product 28. The product 28 is compressed by the usual flat form of the bag 29 and therefore is pressed in the direction of the bag neck 27. The gap 15 is formed such that sliding of the bulk goods in the direction of the bag neck 27 or the sealing region, respectively, is prevented. In dependence of the flowability or the rheological behavior, respectively, of the product 28 to be packaged, the width of the gap 15 can be varied. Furthermore, the clamping bar accommodation 7 and the clamping bar 10, respectively, are lowered in order to clamp the bag 26 and to seal it. In this manner a gas volume flow or airflow, respectively, through the bag neck 27 into the chamber 4 is prevented during a later evacuation of the chamber 4. If the bag 26 comprises a long bag neck 27 as is shown in FIG. 2b, this is additionally clamped by the lid gasket 6.

Preferably the clamping bar 10 is lowered already before closing the chamber 4. Otherwise since the vacuum pump usually is operated continuously for a evacuation, during closing of the chamber 4, air would be sucked from the bag 26 through the bag neck 27 since no perforation is yet present. This may cause under circumstances a contamination of the sealing region by the sucked bulk goods. If a long bag neck is already clamped by the lid gasket 6, this problem does not occur. The accommodation 8 and the separating wire 11, respectively, and the sealing wire 12 are placed in their rest position in this step.

Figure 2C:
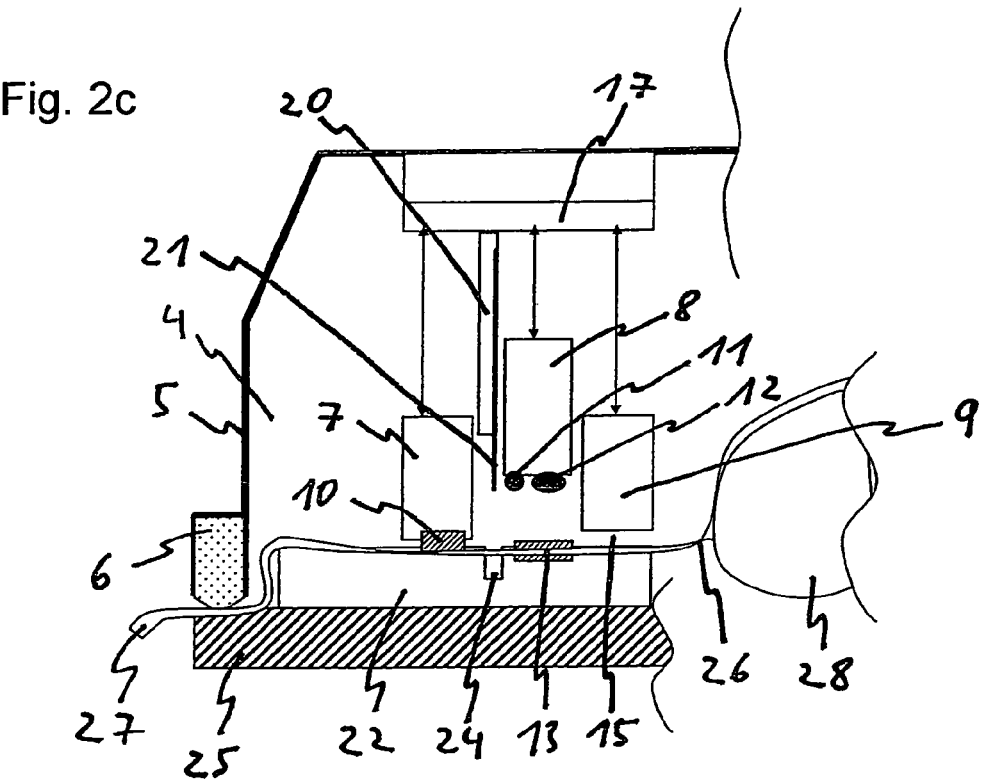
FIG. 2c a schematical sectional view of a part of the chamber belt machine during evacuation of the chamber.

As is shown in FIG. 2c, the perforation device 21 is moved again to its rest position. Simultaneously or thereafter the chamber 4 is evacuated by means of a vacuum pump. It is also conceivable that instead of an integrated vacuum pump in or at the machine, a central vacuum plant is provided.

Figure 2D:
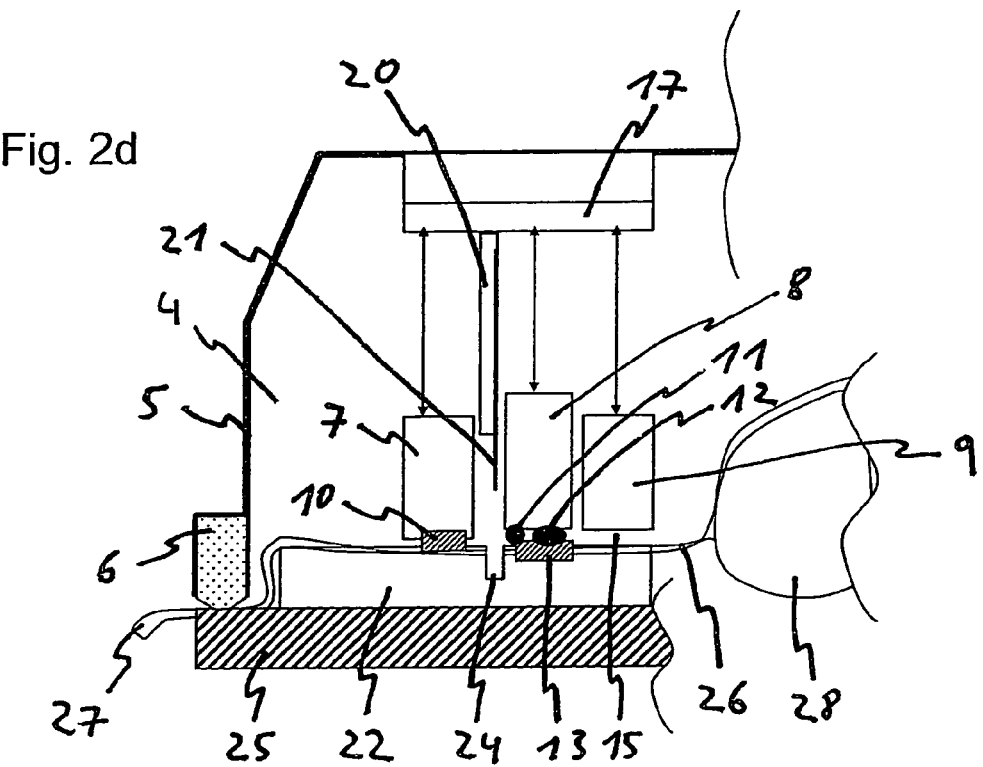
FIG. 2d a schematical sectional view of a part of the chamber belt machine during sealing and separating.

As is shown in FIG. 2d, the accommodation 8 and together with it the separating wire 11 and the sealing wire 12, respectively, are lowered. The bag neck 27 is simultaneously sealed and cut in this manner. The separating wire 11 and the sealing wire 12 cooperate with the anvil 13. The separating wire 11 is for example a heated metal wire. The bag 26 is thus cut-off directly adjacent to the sealing seam. The cut-off perforated bag neck 27 can be disposed of. The clamping bar 10 and the limiting beam 9 remain in their lowered position.

Figure 2E:
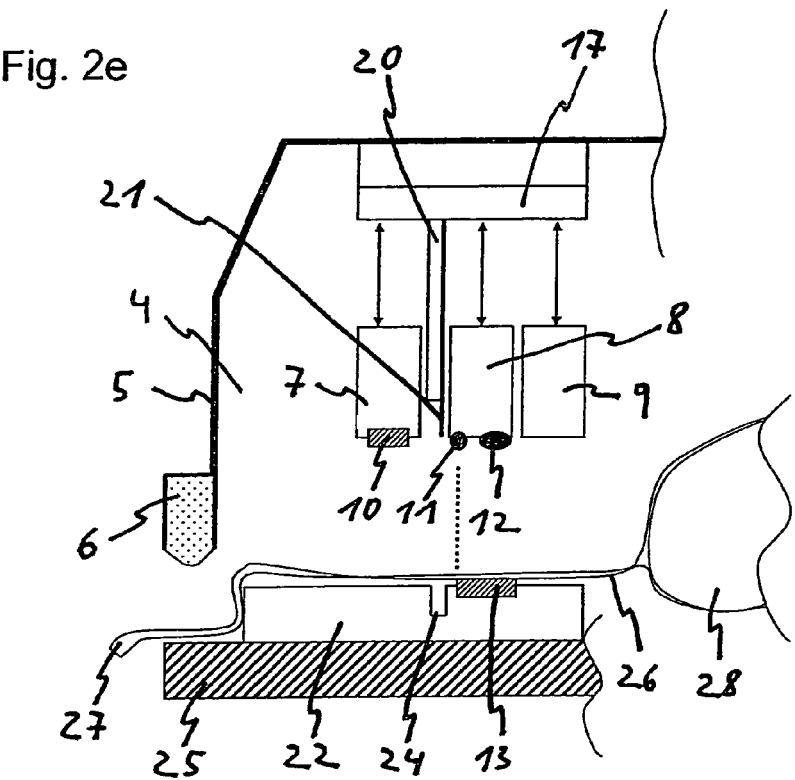
FIG. 2e a schematical sectional view of a part of the chamber belt machine during venting or opening of the lid, respectively.

As is shown in FIG. 2e, the clamping bar accommodation 7, the accommodation 8, the limiting beam 9, the clamping bar 10, the separating wire 11 and the sealing wire 12 are moved into their rest position again. The dashed line in FIG. 2e shows the plane in which the bag neck 27 was separated from the bag 26. In this step the chamber 4 is vented and the lid 5 is opened. The filled and sealed bag 26 can be taken out or can be fed out through the conveyor belt 1 (see FIG. 1), and the method can start again, as is described under FIG. 2a.

Figure 4:
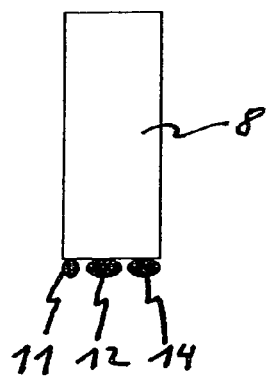
FIG. 4 a schematical sectional view of an accommodation in a second embodiment with two sealing wires and a separating wire.

FIG. 4 shows a second embodiment of the present invention. A second sealing wire 14 is provided additionally to the separating wire 11 and the sealing wire 12 at the accommodation 8. The separating wire 11, the sealing wire 12 and the second sealing wire 14 cooperate with the anvil 13 (see FIGS. 2a to 3). In this manner it is made possible that the bag 26 can be provided with two sealing seams. The stressability as well as the safety of the sealing is improved.

Figure 5:
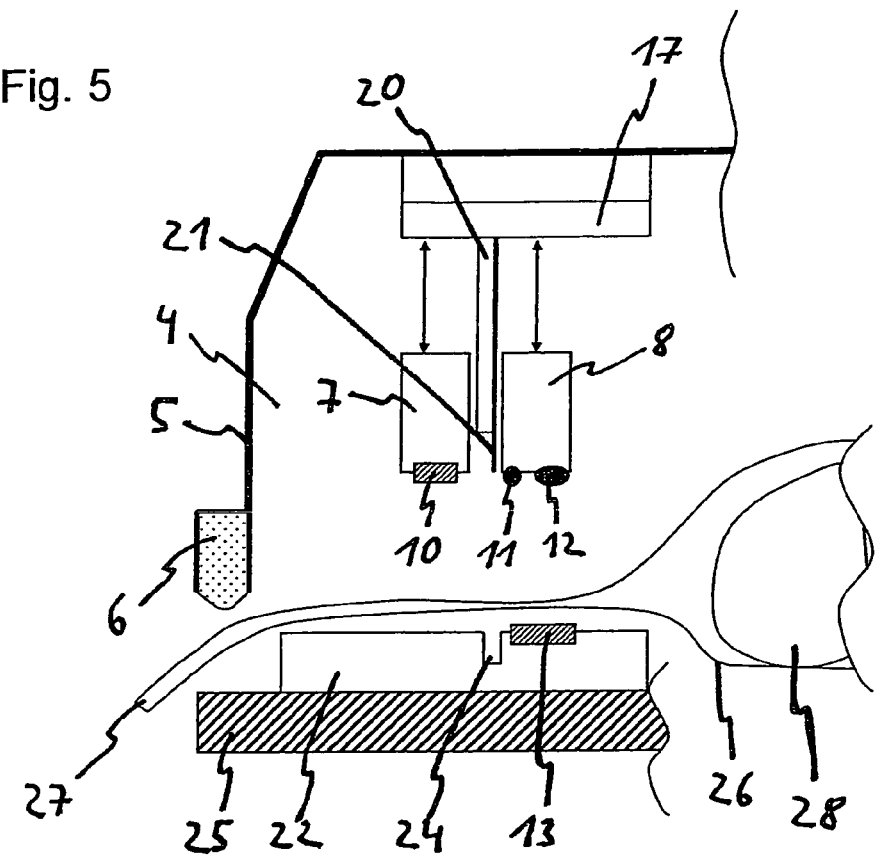
FIG. 5 a schematical sectional view of a part of the chamber belt machine having an opened lid in a further embodiment.

FIG. 5 shows a schematical sectional view of a part of the chamber belt machine in a further embodiment of the present invention. The structure of the device corresponds to the structure shown in FIG. 2a. The only difference is in that in this further embodiment no limiting beam 9 (see FIGS. 2a to e) is provided.

The operation of the device corresponds to the operation described under FIG. 2a. Because of the missing limiting beam 9 (see FIGS. 2a to e) no gap 15 is provided (see FIGS. 2b to d). Because of this constant and slow escape of the air out of the bag 26 during evacuation of the chamber 4, which is obtained according to the present invention, no contamination of the sealing region by the bulk goods takes place in this embodiment.

The shape of the lid is not restricted to the shown shape. The lid can have for example the shape of a hollow sphere or any other arbitrary shape. Further, the arrangement of the clamping bar, the sealing wires and the limiting beam, respectively, are not restricted to the shown shape.

Furthermore, it is possible to provide a membrane valve in the used bags which is employed in a foil region between the clamping bar and the sealing wire. By this membrane the air can escape throttled from the bag. Further, a Tyvac window is conceivable, by which the air can escaped throttled. In both this variances a perforation of the bag is not necessary. The perforation can be a micro perforation as is the case in Goretex™ material which is provided for example in a membrane valve or in Tyvac.

It is also conceivable to deal with a plurality of bags simultaneously. Furthermore, it is conceivable to structure the perforation device otherwise so that it at least can penetrate the foil layer. The openings in the bag can be created in any manner. Furthermore, it is possible to insert already perforated bags into the machine.

Furthermore, it is conceivable to vent the chamber already during sealing of the bag. For this purpose the limiting beam could fix the bag foil together with the clamping bar in order to prevent a damage of the still warm and deformable sealing seam by applying force to the foil which is caused by the air flowing into the chamber.

The invention is not restricted to the package of powdery or granular products. Rather, the package of any form of bulk goods is possible.

The invention furthermore is not restricted to the employment in a chamber belt machine. It is also applicable to a chamber machine without conveyor belt.

The invention claimed is:

1. A method for packaging of bulk goods into bags, the method comprising:
    providing a bag filled with bulk goods;
    forming a chamber around the bag by closing a lid;
    evacuating the chamber;
    providing a limiting beam in the chamber to limit movement of the bulk goods in the bag during evacuation of the chamber;
    perforating the bag in the chamber to form perforations in the bag, or introducing the bag into the chamber already with perforations;
    sealing the bag in the chamber with a sealing device, wherein the sealing device is positioned between the perforations and the limiting beam during the sealing; and further comprising forming a gap in the chamber between the limiting beam and a lower member for receiving a portion of the bag, wherein the gap is maintained during evacuation of the chamber and the gap is formed such that air can escape from the bag and that bulk goods are inhibited from being carried out of the bag by an airflow during evacuation of the chamber.

2. The method according to claim 1, wherein the method comprises perforating the bag in the chamber using a perforation device before, at or after evacuation of the chamber.

3. The method according to claim 1, wherein the perforations are formed as openings having a distance of about 1 mm to about 100 mm from each other and having an area each of about 0.002 mm$^2$ to about 0.2 mm$^2$.

4. The method according to claim 3, wherein the sealing is performed such that a sealing seam is formed on the bag, and wherein the openings are formed in the bag in a line which is essentially parallel to the sealing seam.

5. The method according to claim 1, wherein the perforations are formed as openings having a distance of about 1 mm to about 50 mm from each other and having an area each of about 0.002 mm$^2$ to about 0.1 mm$^2$.

6. The method according to claim 5, wherein the sealing is performed such that a sealing seam is formed on the bag, and wherein the openings are formed in the bag in a line which is essentially parallel to the sealing seam.

7. The method according to claim 1, wherein the perforations are formed as openings having a distance of about 1 mm to about 20 mm from each other and an area each of about 0.005 mm$^2$ to about 0.1 mm$^2$.

8. The method according to claim 7, wherein the sealing is performed such that a sealing seam is formed on the bag, and wherein the openings are formed in the bag in a line which is essentially parallel to the sealing seam.

9. The method according to claim 1, wherein the method comprises perforating the bag using a plurality of needles to form the perforations.

10. The method according to claim 9, wherein the sealing is performed such that a sealing seam is formed on the bag, and wherein the perforations are formed in the bag in a line which is essentially parallel to the sealing seam.

11. The method according to claim 1, further comprising cutting the bag in the chamber, wherein the sealing and the cutting are performed simultaneously.

12. The method according to claim 1, wherein the sealing device comprises a first sealing wire and a second sealing wire, and sealing the bag comprises generating two sealing seams with the first sealing wire and the second sealing wire.

13. The method according to claim 1, wherein the sealing device comprises a sealing wire, and the method comprises simultaneously sealing the bag with the sealing wire and venting the chamber.

14. The method according to claim 1, further comprising lowering a clamping bar onto a neck of the bag, wherein the sealing device is positioned between the clamping bar and the limiting beam during the sealing.

15. The method of claim 1 wherein the limiting beam is movable with respect to the lid.

16. The method of claim 1 further comprising lowering the limiting beam below the sealing device prior to the sealing.

17. The method of claim 1 wherein the limiting beam and the sealing device are independently movable with respect to the lid.

18. The method of claim 1 wherein the method comprises perforating the bag in the chamber with a perforation device, and the sealing device is disposed between the perforation device and the limiting beam.

19. The method according to claim 1 wherein the bag has a bag neck with an end, and the sealing device is positioned between the limiting beam and the end of the bag neck during the sealing.

20. A method for packaging bulk goods into bags, the method comprising:
    providing a bag filled with bulk goods;
    forming a chamber around the bag by closing a lid;
    evacuating the chamber;
    providing a limiting beam in the chamber to limit movement of the bulk goods in the bag during evacuation of the chamber;
    perforating the bag in the chamber with a perforation device;
    sealing the bag in the chamber with a sealing device, wherein the sealing device is positioned between the perforation device and the limiting beam; and further comprising forming a gap in the chamber between the limiting beam and a lower member for receiving a portion of the bag, wherein the gap is maintained during evacuation of the chamber and the gap is formed such that air can escape from the bag and that bulk goods are inhibited from being carried out of the bag by an airflow during evacuation of the chamber.

21. The method of claim 20 wherein the limiting beam is movable with respect to the lid.

22. The method of claim 20 further comprising lowering the limiting beam below the sealing device prior to the sealing.

23. The method of claim 20 wherein the limiting beam and the sealing device are independently movable with respect to the lid.

24. The method according to claim 20 wherein the bag has a bag neck with an end, and the sealing device is positioned between the limiting beam and the end of the bag neck during the sealing.

* * * * *